April 29, 1952 L. M. HOPKINS 2,594,559
FUEL LINE VALVE LOCK
Filed Nov. 10, 1948 3 Sheets-Sheet 1

INVENTOR.
LESTER M. HOPKINS
BY C. G. Stratton
ATTORNEY

April 29, 1952 L. M. HOPKINS 2,594,559
FUEL LINE VALVE LOCK
Filed Nov. 10, 1948 3 Sheets-Sheet 2
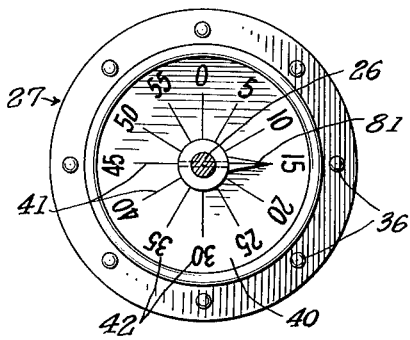
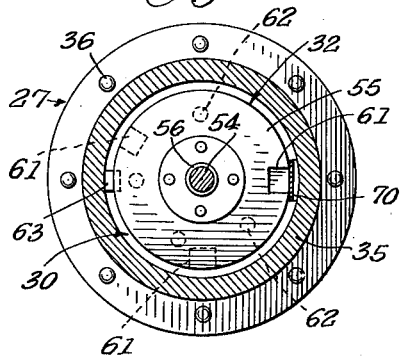
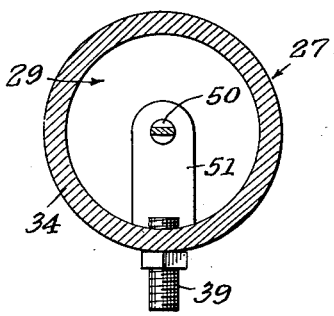
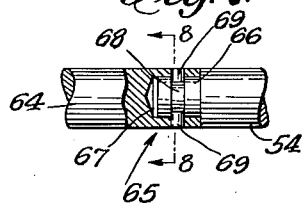
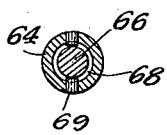
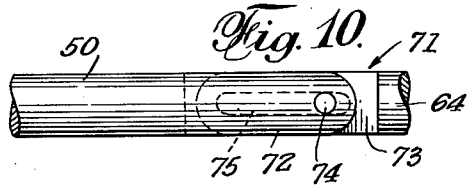
INVENTOR.
LESTER M. HOPKINS
BY C. G. Stratton
ATTORNEY April 29, 1952     L. M. HOPKINS     2,594,559
FUEL LINE VALVE LOCK
Filed Nov. 10, 1948     3 Sheets-Sheet 3
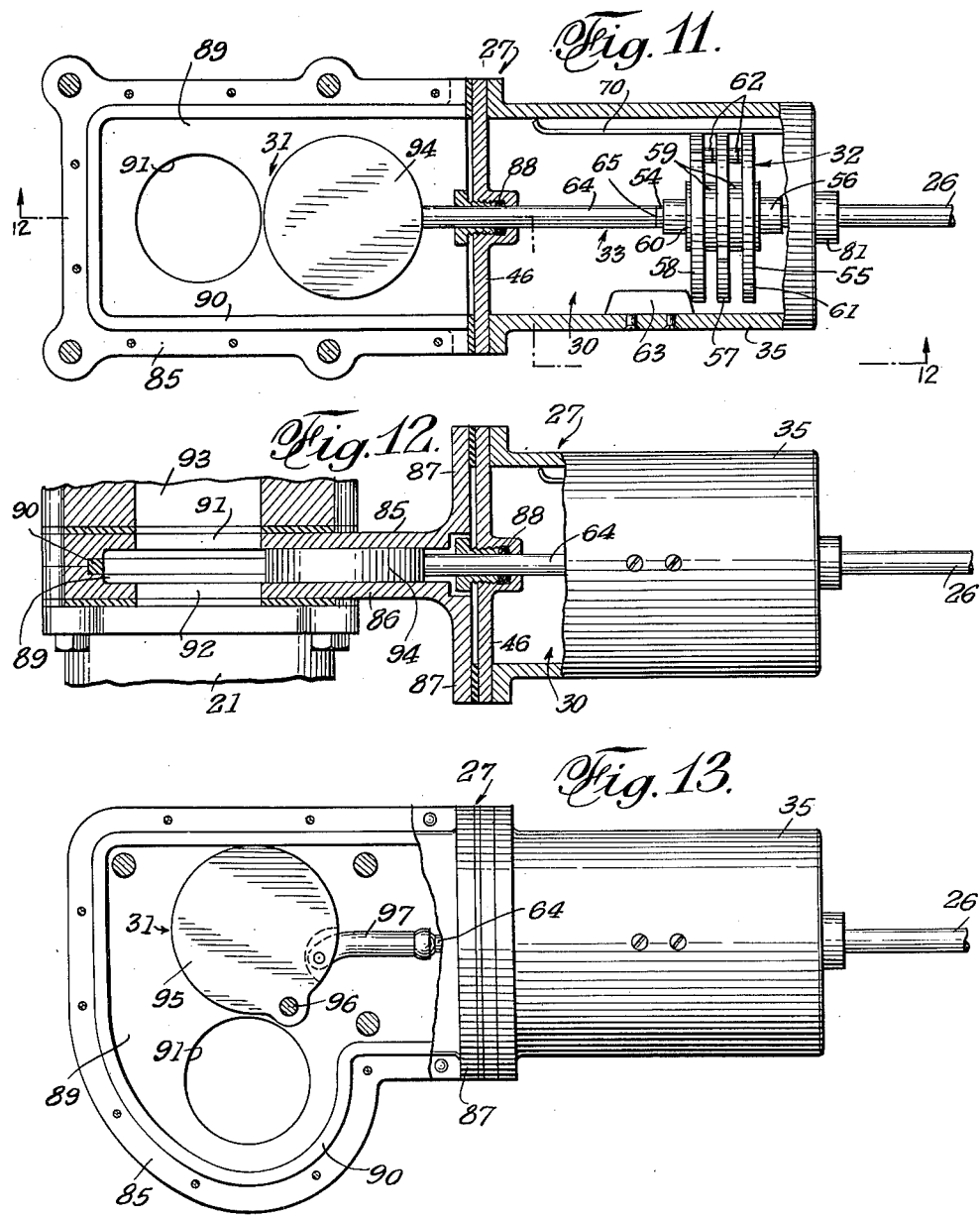
INVENTOR.
LESTER M. HOPKINS
BY C. G. Stratton
ATTORNEY Patented Apr. 29, 1952

2,594,559

UNITED STATES PATENT OFFICE 2,594,559

FUEL LINE VALVE LOCK

Lester M. Hopkins, Los Angeles, Calif.

Application November 10, 1948, Serial No. 59,339

2 Claims. (Cl. 70—242)

This invention relates to anti-theft devices for automobiles and deals more particularly with a lock in the fuel or gasoline line feeding the motor of an automotive vehicle.

An object of the present invention is to provide a keyless locking means in the fuel line of an automotive vehicle that is adapted to be operated only by a person familiar with the setting of the locking means.

More specifically, an object of the invention is to provide a combination lock embodied in the fuel line locking means, the same being operable from the driver's position in the vehicle, or, if tampered with, directly from said locking means.

Another object of the invention is to provide locking means of the character indicated that can be operated to lock a fuel line without knowledge of the combination controlling opening of said line.

The invention also has for its objects to provide such means that are positive in operations, convenient in use, easily installed in a working position and easily disconnected therefrom, economical of manufacture, relatively simple, and of general superiority and serviceability.

The invention also comprises novel details of constructions and novel combinations and arrangements of parts, which will more fully appear in the course of the following description. However, the drawings merely show and the following description merely describes embodiments of the present invention, which are given by way of illustration or example only.

In the drawings, like reference characters designate similar parts in the several views.

Fig. 4 is an end view as seen from the right of Fig. 2.

Figure 1:
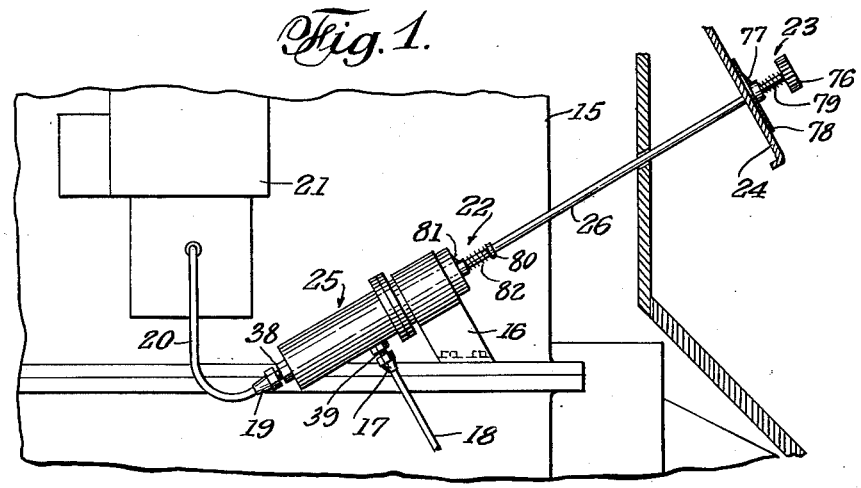
Fig. 1 is a side elevational view of one form of locking means according to the present invention, showing the same installed to control the fuel line of an automotive vehicle.
Figure 2:
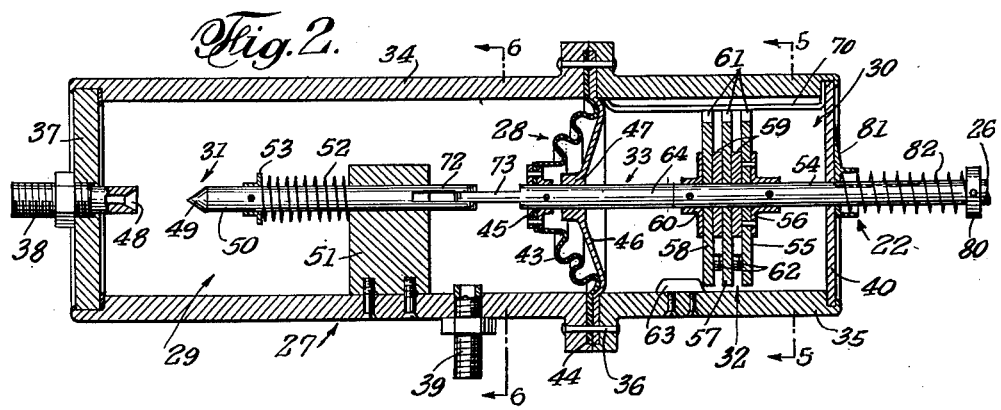
Fig. 2 is an enlarged longitudinal sectional view thereof in open position, allowing unrestricted flow of fuel in the fuel line.
Figure 3:
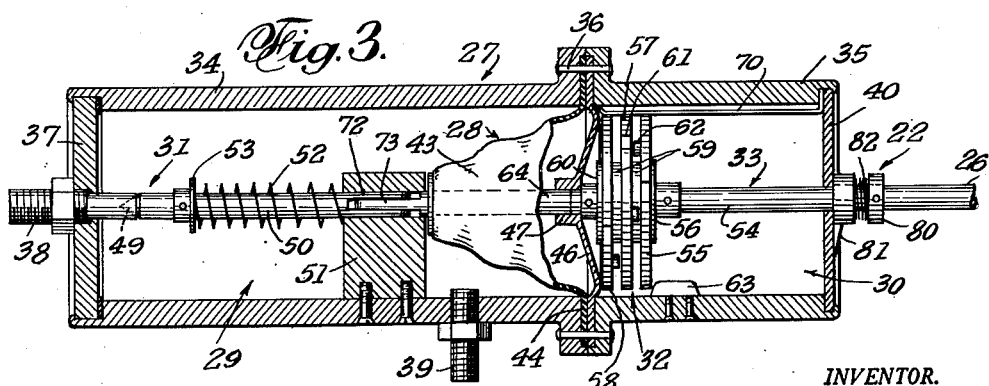
Fig. 3 is a similar view showing the locking means in fuel-locking position.

Figs. 5 and 6 are cross-sectional views as taken on lines 5—5 and 6—6, respectively of Fig. 2.

Fig. 7 is a further enlarged fragmentary detail view, partly broken away, showing a swivel connection used on an operating shaft of the locking means.

Fig. 8 is a cross-sectional view on line 8—8 of Fig. 7.

Figs. 9 and 10 are fragmentary side elevational views showing, respectively, extended and contracted positions of said operating shaft.

Fig. 11 is a longitudinal sectional view of another form of locking means.

Fig. 12 is a sectional view taken on line 12—12 of Fig. 11.

Fig. 13 is a partial elevational and partial longitudinal sectional view of still another modification.

That form of the invention that is illustrated in Figs. 1–10 is particularly adapted to be embodied in the line that conducts fuel to the carburetor, whereas the modifications shown in Figs. 11-13 are more particularly adapted to be positioned between a carburetor and the intake manifold of an engine.

The first-mentioned form of the locking means of the invention is mounted on the motor 15 of an automotive vehicle by means of a bracket 16, has a connection 17 to a tubing line 18 extending from the fuel tank, a connection 19 to a length of tubing 20 extending to the carburetor 21, means 22 for directly operating said locking means, and means 23 for operating the same from the instrument panel 24 of the vehicle. While the device, designated 25, may be otherwise disposed, the same is preferably arranged at substantially the angle shown to thereby obviate joints, knuckles, etc. in a connection 26 provided between the means 22 and 23. Accordingly, such adjustability as may be necessary is provided in bracket 16 so that the locking device may be mounted in suitable operative relation to instrument panel 24.

The locking means 25 comprises, generally, a housing 27 divided by means 28 to have a flow chamber 29, at one end, and a lock-housing chamber 30 at the other, a flow-controlling valve 31 in chamber 29, a combination lock 32 in chamber 30, and an operating shaft 33 comprising an extension of connection 26 and extending through chamber 30 and into chamber 29.

The housing 27 comprises tubular housing sections 34 and 35 having abutting flanges connected by rivets 36. The open end of section 34 is closed by a plate 37 that carries a nipple 38 to which fitting 19 connects tube 20. A nipple 39 extends laterally into the tubular wall of section 34, said latter nipple connecting to fitting 17 of fuel line 18. The open end of section 35 is closed by a plate 40 having on its outer face uniformly arranged radial markings 41 and suitable numbers 42 associated with said markings.

The means 28 includes a flexible sealing bellows 43 that has a flange 44 for sealing between the housing sections and connected by a pair of clamping discs 45 to operating shaft 33. It will be evident that bellows 43 seals chamber 29 against leakage. The means 28 further includes a transverse wall 46 provided with a bearing 47 for shaft 33, said wall and bearing being on the side of the bellows toward chamber 30.

The flow-controlling valve 31 comprises a conical seat 48 formed in the end of nipple 38 that extends into chamber 29, a conical end 49 on a shaft part 50 of operating shaft 33, and a bearing block 51 for said shaft part and carried by housing section 34 within chamber 29. The valve end 49 is normally urged in a direction toward valve seat 48 by a coil spring 52 having one end abutted against block 51 and the other against a flanged disc 53 on shaft part 50 adjacent end 49. It will be evident that with valve 31 open, there is unrestricted flow of fuel from nipple 39 into chamber 29, and out through nipple 38.

The combination lock 32 is mounted within chamber 30 on an extension 54 of connection 26, said extension passing through a suitable opening in plate 40 and into chamber 30. Said combination lock comprises a disc 55 fixed to shaft extension 54 by means of a flanged collar 56 and, at least, two additional loosely mounted discs 57 and 58 on said extension toward wall 46. Said discs are spaced by washers 59 and held in stacked relation by a flanged collar 60. Except that disc 55 is fixed on the shaft extension, the combination lock is generally conventional. Accordingly, each disc is provided with a peripheral notch 61 and with lateral projections 62 which interengage and effect rotational movement of one disc by the other to effect alignment of notches 61.

A key 63 is carried within chamber 30 on the inner wall thereof to permit endwise movement of shaft 33 when the disc notches are aligned with said key.

Inasmuch as connection 26 and its extension 54 are rotatable for the setting of the combination and the shaft part 64, that connects said extension and shaft part 50, is not, since the bellows resists rotation of shaft part 64, a swivel 65, best seen in Figs. 7 and 8, is provided for connecting said extension and shaft part 64. Said swivel comprises a reduced end 66 on extension 54 that fits in an end bore 67 in shaft part 64, an annular groove 68 in said reduced end, and one or more radial pins 69 on part 64 extending into said groove. Thus extension 54 and shaft part 64 move together axially while only the former is rotatable.

During setting of the combination, to insure that either loose disc 57 or 58, or both, retain a set position unless positively moved by projections 62, a leaf spring 70 is arranged to frictionally exert a drag on the peripheries of said discs, substantially as shown.

A non-rotational sliding connection 71 is provided between shaft parts 50 and 64, the same being best shown in Figs. 9 and 10. Said sliding connection comprises a bifurcated end 72 on part 50, a tongue 73 on part 64 and extending into the bifurcation, a pin 74 extending across the bifurcation, and an elongated slot 75 in the tongue and through which the pin projects. This sliding connection is so proportioned that starting with the normal position of Fig. 2, endwise movement toward the left of connection 26 will release shaft part 50 so that spring 52 may project the valve end 49 thereof toward valve seat 48. The closing of valve 31 is, thus, solely effected by spring 52. From the closed position of Fig. 3, this valve can be opened only when all three discs 55, 57 and 58 have their notches 61 aligned with key 63, since any retractive endwise movement of connection 26 will either cause the disc 55 to encounter key 63 or, if the notch of the latter disc is aligned with said key, partial retraction may be effected, but the combination cannot be set for the reason that disc 55 cannot then be rotated to effect setting of the loose discs. Sliding connection 71 permits such partial retraction of connection 26 without opening valve 31. Only when the combination has been set, can full retraction be effected to open said valve.

Setting of the combination is normally effected, from the driver's position, by means 23 which comprises a knob 76 on the end of the connection shaft 26 that projects through instrument panel 24, a pointer 77 slidingly keyed to said shaft and associated with a disc 78 graduated in a manner similar to the markings 41 of plate 40, and a coil spring 79 for, at all times, urging said pointer against said disc. It will be clear that pointer 77 rotates with shaft 26 and is pressed by spring 79 against disc 78 while said shaft is moved endwise.

Should means 23 be tampered with so as to render the same inoperable, means 22, which is similar, may be employed for setting the combination. In the latter means, the collar 80 is fixed to shaft 26 and is comparable to knob 76, and the pointer 81 and spring 82 are, respectively, comparable to the pointer 77 and spring 78 of means 23.

The above-described device may be locked without knowledge of the combination, since it is a simple matter, by feel, to align the notch of disc 58 with key 63 while pressing endwise on knob 76, and then successively similarly aligning the notches of discs 57 and 55 so that spring 52 may become effective to close valve 31. However, opening of valve 31 can be effected only by initially setting the combination by first rotating knob 76 in one direction then in the other, and finally in the first direction to effect alignment of the notches 61 with key 63. The operable manipulation of the combination is conventional for such devices and the same may, of course, comprise any suitable number of combination discs.

In the form of the invention shown in Figs. 11 and 12, only the valve 31 is changed, and, accordingly, the housing 27 is altered. The housing section 34 of the described embodiment is changed to comprise laterally separable sections 85 and 86 that are flanged at 87 to connect with section 35. In this form, a stuffing box 88 seals around operating shaft part 64 to seal chamber 89, a gasket 90 being also provided to seal between sections 85 and 86. Aligned ports 91 and 92 in said respective sections allow for fuel flow from carburetor 21 to engine manifold 93 and a valve disc 94 affixed to the end of shaft part 64 is arranged between sections 85 and 86 to close said flow upon endwise movement of said shaft part as permitted by combination lock 32. In other respects, the construction may follow that described for the embodiment of Figs. 1–10.

The slide gate type of valve of Figs. 11 and 12 may be varied. As shown in Fig. 13, the same may comprise a valve plate 95 on a pivot 96 that, through a link 97, is actuated by endwise movement of shaft part 64, to control flow through parts 91 and 92 as above described. While the housing sections 85 and 86 are somewhat altered in form, they are comparable to those of the modification of Figs. 11 and 12.

The latter two forms of the device are designed to be introduced between a carburetor and the intake manifold of an engine to control the fuel flow into the latter. It is evident that the same may be disposed at any suitable angle to bring the connection 26 to and through the instrument panel. However, if a universal joint is indicated in the arrangement, the same may be incorporated in said connection.

While the invention that has been illustrated and described is now regarded as the preferred embodiments, the construction is, of course, subject to modifications without departing from the spirit and scope of the invention. It is therefore not desired to restrict the invention to the particular forms of construction illustrated and described, but to cover all modifications that may fall within the scope of the appended claims.

Having thus described my invention, what I claim and desire to secure by Letters Patent is:

1. A lock device for a flow-controlling valve having a non-rotational axially movable stem, a rotational axially movable shaft extending in alignment with said stem, a swivel connecting the stem and shaft, a fixed housing through which the connected ends of the stem and shaft extend, said shaft having an elongated extension beyond the housing, a set of combination lock discs provided on the shaft adjacent its connection to said stem and residing within said housing, a key extending into the interior of the housing intermediate the length thereof, and means on the extension of the shaft to move the same both rotationally and axially to move the lock discs from a position beyond one end of the key to a position beyond the other end to, thereby, move the valve and stem thereof from an open position of the valve to a closed position, said shaft being rotational in both said positions.

2. In a lock device, a housing, a shaft extending axially through said housing and movable both rotationally and axially relative to the housing, a set side-by-side of peripherally-notched combination lock discs having notch-aligning and interengaging lateral projections and carried by said shaft within the housing, one of said discs being fixed to the shaft and the others rotational thereon and a fixed key extending into the housing intermediate the length thereof, the shaft being rotationally and axially movable to successively interengage the lateral projections thereof to successively align the notches of the lock discs with said key to move said set of discs from a position beyond one end of the key to a position beyond the other end, whereby the shaft is freely rotational in both said positions.

LESTER M. HOPKINS.

REFERENCES CITED

The following references are of record in the file of this patent:

UNITED STATES PATENTS

| Number | Name | Date |
|---|---|---|
| 1,172,823 | Murray et al. | Feb. 22, 1916 |
| 1,182,586 | Rogers | May 9, 1916 |
| 1,221,044 | Golz | Apr. 3, 1917 |
| 1,270,911 | Woods | July 2, 1918 |
| 1,368,526 | Patterson | Feb. 15, 1921 |
| 1,475,089 | Summers | Nov. 20, 1923 |
| 1,493,336 | Glenn | May 6, 1924 |
| 1,510,417 | Prigan | Sept. 30, 1924 |
| 1,691,484 | King et al. | Nov. 13, 1928 |

FOREIGN PATENTS

| Number | Country | Date |
|---|---|---|
| 576,295 | France | of 1924 |